July 8, 1958 A. KREIDLER ET AL 2,841,989
KICK STARTER DEVICE

Original Filed June 23, 1954 3 Sheets-Sheet 1

INVENTORS
Alfred Kreidler and Hanns Hilber
By Ernest P. Montague
Attorney

July 8, 1958  A. KREIDLER ET AL  2,841,989
KICK STARTER DEVICE

Original Filed June 23, 1954  3 Sheets-Sheet 3

INVENTORS
Alfred Kreidler and Hanns Lilke

United States Patent Office 2,841,989  
Patented July 8, 1958

2,841,989
KICK STARTER DEVICE

Alfred Kreidler and Hanns Hilber, Stuttgart, Germany; said Hilber assignor to said Kreidler Original application June 23, 1954, Serial No. 438,774, now Patent No. 2,781,033, dated February 27, 1957. Divided and this application September 11, 1956, Serial No. 609,171

Claims priority, application Germany June 27, 1953

2 Claims. (Cl. 74—6)

The present invention concerns engine gearbox units for engine-assisted pedal cycles and for light motorcycles.

This is a division of the copending patent application Series No. 438,774, filed June 23, 1954.

Arrangements have already frequently been made so that an engine-assisted pedal cycle may be driven in the manner of a motorcycle, that is to say, with a comfortable foot support. In particular, pedal cranks have been used for this purpose, one crank being detachably secured to the pedal crankshaft and parallel to the other one, preferably in a position directed forward.

Such solutions were always of a rather makeshift nature since the vehicle had first to be started by treading down the pedals and then one crank had to be brought into the described supporting position for the feet of the driver.

It is, therefore, one object of the present invention to provide engine gearbox units which make possible conversion of the gear of an engine-assisted pedal cycle into a gear for a light motorcycle having a kickstarter device, and vice versa, by exchanging a few minor parts. This may be an advantage for the purchaser who is now in a position to convert his engine-assisted pedal cycle subsequently into a light motorcycle with slight effort and only little cost. In particular, the invention is economically important to the manufacturer who is now able to manufacture the gear mechanism as a gear for an engine-assisted pedal cycle or a gear for a light motorcycle, after starting from a basic form. Therefore, he can now manufacture two types of gear mechanism or two types of vehicle, respectively, with one and the same set of tools and machine parts, and to keep down the parts in stock to a minimum for manufacturing and the service of customers.

It is yet another object of the present invention to provide a kickstarter device which is fitted into an engine-assisted pedal cycle gear mechanism, instead of a pedal crank drive, and cooperates with means provided independently in the gear mechanism for the engagement of the pedal crank drive. It is preferable for the kickstarter shaft to be coupled with an intermediate wheel which engages, in its turn, in a serration on the driven shaft of the gear mechanism.

With these and other objects in view which will become apparent in the following detailed description, the present invention will be clearly understood in connection with the accompanying drawings, in which.

Figure 1:
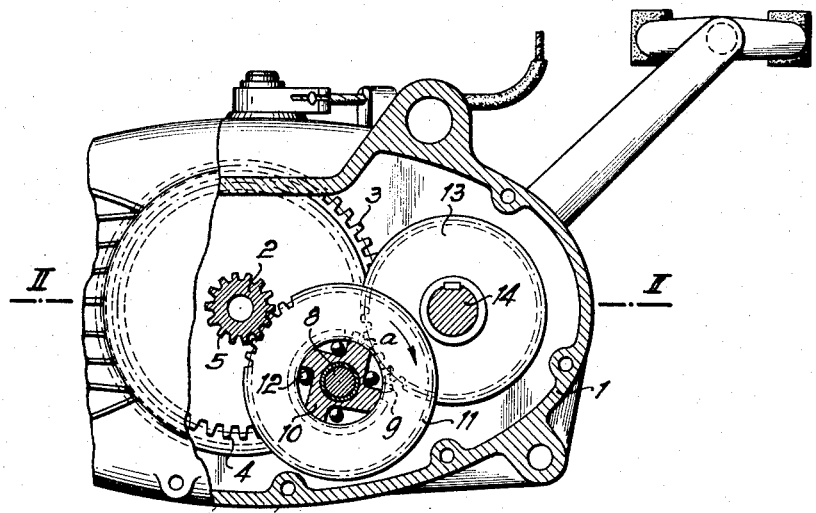
Figure 1 is a longitudinal section through the gear of an engine-assisted pedal cycle having a pedal crank drive.

Referring now to the drawing, a driven shaft 2 is mounted in a gear housing 1. Gear wheels 3 and 4 carried by the shaft 2 may be selectively coupled to the speed change mechanism. These gear wheels 3, 4 are permanently in engagement with counter wheels (not shown) driven by the engine. Teeth 5 are cut directly on the driven shaft 2. Outside the housing 1 a disengageable multi-disc clutch 6 is mounted overhung on the driven shaft in order to couple the chain wheel 7 with the driven shaft 2.

Figure 2:
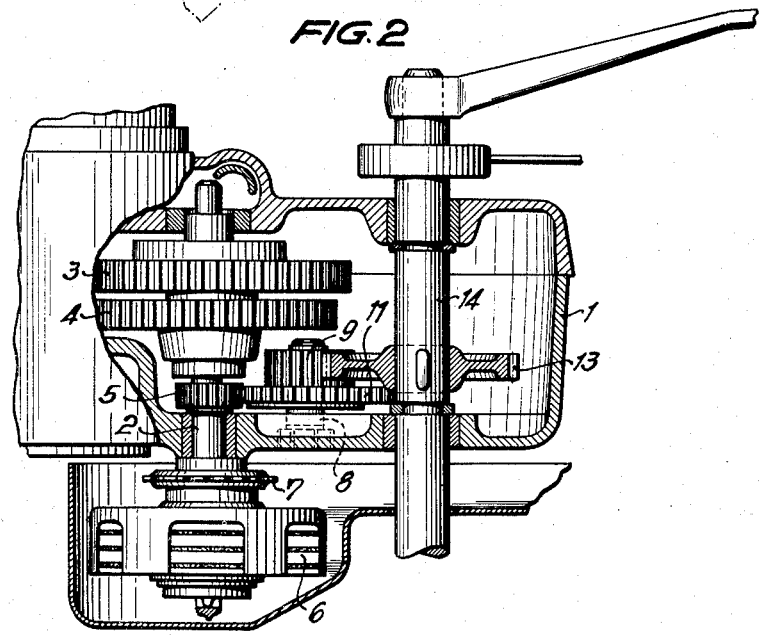
Fig. 2 is a section along the lines 2—2 of Fig. 1.

An axle 8 is also mounted within the housing 1. This axle carries a gear wheel 9 (Figs. 1 and 2), the hub 10 of which is provided with locking cams for a freewheel, and is also mounted in the housing 1. A gear wheel 11 running on the hub 10 is coupled with the gear wheel 9 by the locking rollers 12 of the freewheel in the direction of the arrow a. The gear wheel 11 is in engagement with the teeth 5 of the driven shaft 2; the gear wheel 9, on the other hand, meshes with a gear wheel 13 which is fixedly mounted on the pedal crankshaft 14. The latter is also mounted in the gear housing 1.

Figure 3:
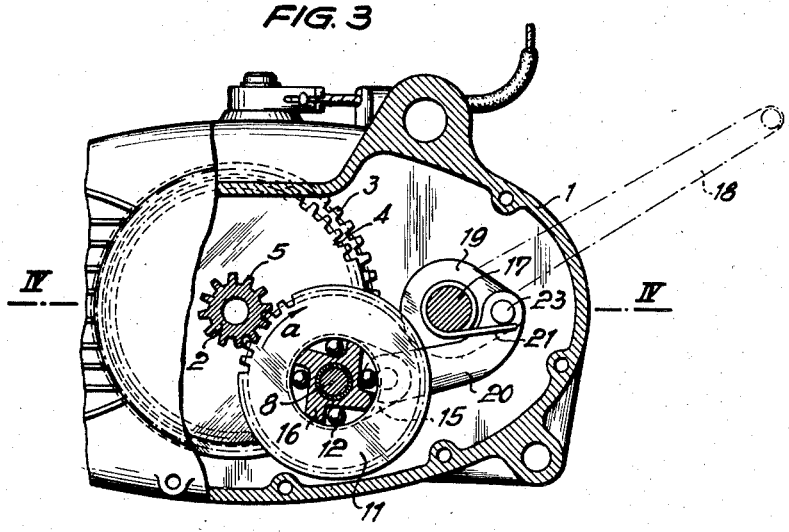
Fig. 3 is the same longitudinal section as in Fig. 1, however, with a kickstarter device fitted instead of the pedal crank drive.
Figure 4:
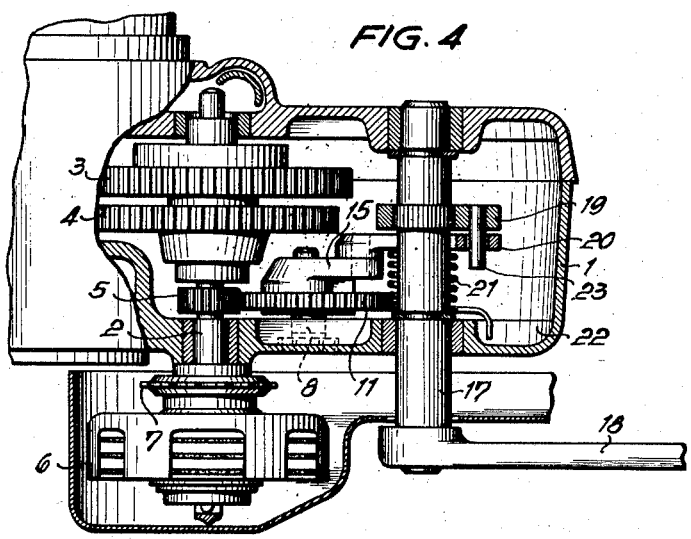
Fig. 4 is a section along the lines 4—4 of Fig. 3.

As shown in Figs. 3 and 4, the gear wheel 9 is replaced by a lever 15 having a hub 16 which also carries locking cams. By means of these cams, and the locking rollers 12, the gear wheel 11 is coupled, in its turn, with the lever 15 in the direction of the arrow a.

Instead of the crankshaft 14 a kickstarter shaft 17 is now fitted into the housing 1. This shaft 17 carries on its left outer side the kickstarter lever 18. A lever 19, secured on the shaft 17 within the housing 1, is connected by means of a pivot pin 23 to one end of an arm 20 the other end of which is pivotally connected to the lever 15. In this manner a slide crank gear mechanism 15, 20, 19 is provided. In order to return the kickstarter device into its resting position a torsion helical spring 21 is used; one end of this spring 21 abuts against a rib 22 of the housing, and, the other bears against the connection pin 23. The function of the pedal crank drive or the kickstarter device is obvious and thus no explanations need be given for this purpose.

Figure 5:
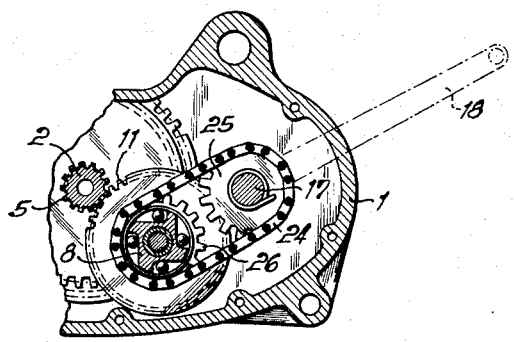
Fig. 5 is a fragmentary view of a chain pull or chain drive as equivalent of the kickstarter lever drive shown in Figs. 3 and 4.

As may be seen, a kickstarter device, instead of the pedal crank drive, may be assembled by changing only a few parts. The parts 9, 10, 13 and 14 are merely replaced by the parts 15, 16, 17—23. If, finally, the gear wheel 9 is disconnectable on its hub 10 (Fig. 6), the latter does not even need to be exchanged. By fitting the slide crank gear mechanism 15, 20, 19 a gear ratio is obtained which is favorable for starting the engine. Instead of the slide crank gear mechanism, a chain pull or a chain drive could also be used (Fig. 5), and in particular a chain 24 replaces the arm 20, which chain 24 is guided by sprocket gears 25 and 26 and upon operation of the kickstarter the movement thereof is transferred to the wheel gear 11. In order to convert the cycle from a light motorcycle into an engine-assisted pedal cycle, the parts 15, 16, 17—23 are replaced by the parts 13 and 14.

Figure 6:
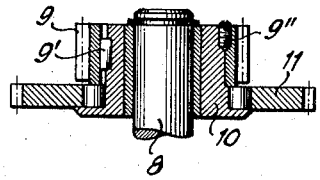
Fig. 6 is a fragmentary section of a gear wheel disconnectable on its hub as a variation to the arrangement shown in Fig. 3.

Referring now to Fig. 6, a releasable mounting of the gear wheel 9 on the hub 10 is shown at an enlarged scale. The gear wheel 9 is secured in position on the hub 10 by means of a key 9′ and retained by a set screw 9″.

While we have disclosed several embodiments of the present invention, it is to be understood that these embodiments are given by example only and not in a limiting sense, the scope of the present invention being determined by the objects and the claims.

We claim:

1. In an engine-gearbox unit for engine-assisted pedal cycles and for light motorcycles, a housing, an engine-driven shaft rotatably mounted within said housing, a second shaft rotatably mounted within and extending outside of said housing, power-transmitting means carried by said second shaft within said housing, an intermediate freewheel lever rotatably mounted within said housing and being capable of transmitting an engine-starting torque from said second shaft to said engine-driven shaft, power-receiving means carried by said intermediate freewheel lever and operatively connected to said power-transmitting means, and said housing having a rib adjacent said second shaft, an arm pivotally connected with said freewheel lever, a second lever and a helical torsion spring, said arm being connected with said second lever by means of a pivot pin, and said second lever being secured to said second shaft, and said helical torsion spring being disposed on said second shaft and one end of said spring engaging said pivot pin and the other end of said spring abutting said rib of the housing.

2. In an engine-gearbox unit for engine-assisted pedal cycles and for light motorcycles, a housing, an engine-driven shaft rotatably mounted within said housing, a second shaft rotatably mounted within and extending outside of said housing, a power-transmitting means carried by said second shaft within said housing, an intermediate kickstarter means rotatably mounted within said housing and being capable of transmitting an engine-starting torque from said second shaft to said engine-driven shaft, power receiving means disposed between said kickstarter means and said power-transmitting means and operatively connected to the latter, and said housing having a rib adjacent said second shaft, said kickstarter means including a freewheel lever, an arm, a second lever and a helical torsion spring, said freewheel lever being pivotally connected with said arm, and the latter being connected with said second lever by means of a pivot pin, and said second lever being secured to said second shaft, and said helical torsion spring being disposed on said second shaft and one end of said spring engaging said pivot pin and the other end of said spring abutting said rib of the housing.

References Cited in the file of this patent

UNITED STATES PATENTS

| | | |
|---|---|---|
| 1,125,130 | Lake, et al. | Jan. 19, 1915 |
| 1,125,842 | Gustafson | Jan. 19, 1915 |
| 1,786,763 | Mack | Dec. 30, 1930 |
| 2,596,512 | Thomas, Jr. | May 13, 1952 |
| 2,638,175 | Paulsen | May 12, 1953 |
| 2,644,439 | Behringer | July 7, 1953 |
| 2,679,166 | Kreis | May 25, 1954 |
| 2,725,579 | Kreidler | Dec. 6, 1955 |
| 2,781,033 | Kreidler et al. | Feb. 12, 1957 |